US008896894B2

(12) United States Patent
Anderson, III

(10) Patent No.: US 8,896,894 B2
(45) **Date of Patent: *Nov. 25, 2014**

(54) METHOD FOR FORMING STRUCTURED MICRODOTS

(71) Applicant: Eastman Kodak Company, Rochester, NY (US)

(72) Inventor: John T. Anderson, III, Mt. Lebanon, PA (US)

(73) Assignee: Eastman Kodak Company, Rochester, NY (US)

( * ) Notice: Subject to any disclaimer, the term of this patent is extended or adjusted under 35 U.S.C. 154(b) by 24 days.

This patent is subject to a terminal disclaimer.

(21) Appl. No.: 13/622,382

(22) Filed: Sep. 19, 2012

(65) Prior Publication Data

US 2014/0076184 A1 Mar. 20, 2014

(51) Int. Cl.
*H04N 1/46* (2006.01)

(52) U.S. Cl.
USPC ............ 358/504; 358/1.2; 358/1.9; 358/3.12; 358/3.17; 358/534; 101/130; 101/481; 101/485

(58) Field of Classification Search
CPC ............ B41C 1/00; B41C 1/05; B41F 13/12; B41M 1/04; B41M 3/14; B41N 3/00
See application file for complete search history.

(56) References Cited

U.S. PATENT DOCUMENTS

| | | | | |
|---|---|---|---|---|
| 5,576,830 | A * | 11/1996 | O'Brien et al. | 356/617 |
| 5,626,076 | A * | 5/1997 | Ireton | 101/401.1 |
| 5,633,676 | A * | 5/1997 | Harley et al. | 348/95 |
| 6,079,806 | A * | 6/2000 | Wen et al. | 347/10 |
| 6,103,353 | A * | 8/2000 | Gasper et al. | 428/195.1 |
| RE38,065 | E * | 4/2003 | Bravenec et al. | 101/211 |
| 7,123,384 | B2 * | 10/2006 | Koifman | 358/3.21 |
| 8,102,282 | B2 * | 1/2012 | Wei et al. | 341/5 |
| 2011/0265676 | A1 * | 11/2011 | Golan et al. | 101/485 |

OTHER PUBLICATIONS

"Don't over think it" by John Anderson, Sep. 2009; http://www.packageprinting.com/article/flexo-platemaking-complex-only-if-you-let-become-so-405055/2#; 4 pages.*

* cited by examiner

*Primary Examiner* — Dung Tran
(74) *Attorney, Agent, or Firm* — Nelson Adrian Blish

(57) ABSTRACT

A method of making structured microdots (154) for printing plate registration includes forming a first plurality of square spots (156) less than or equal to 11 microns; wherein a first group (157) of the first plurality of square spots is formed in a first pattern (158); and wherein the first pattern is less than or equal to 66 microns and comprises a first microdot.

12 Claims, 23 Drawing Sheets

METHOD FOR FORMING STRUCTURED MICRODOTS

CROSS REFERENCE TO RELATED APPLICATIONS

Reference is made to commonly-assigned copending U.S. patent application Ser. No. 13/622,385, filed Sep. 19, 2012, entitled SYSTEM FOR FORMING STRUCTURED MICRODOTS, by Anderson; U.S. patent application Ser. No. 13/622,386, filed Sep. 19, 2012, entitled METHOD OF FORMING SECURITY MARKINGS, by Anderson; and U.S. patent application Ser. No. 13/622,387, filed Sep. 19, 2012, entitled SYSTEM FOR FORMING SECURITY MARKINGS USING STRUCTURED MICRODOTS; the disclosures of which are incorporated herein.

FIELD OF THE INVENTION

This invention relates in general to flexographic printing and in particular to using microdots for plate registration.

BACKGROUND OF THE INVENTION

The flexographic industry has developed over the years from hand carved rubber plates with no expectations of register control between colors, to use of a photopolymer plate 100, shown in FIG. 1, supported by a polymer sheet 101 to provide dimensional stability and allow registration between colors.

Flexographic printing was the least of the print processes in terms of capabilities and the lowest cost compared to the traditional offset, letterpress and rotogravure printing processes used for package printing. Since the introduction of the photopolymer plate making systems, the growth in use of flexography has been significant, becoming the largest printing process used in packaging, and in some regions, like North America gaining over 80 percent of market share.

Throughout the development process, registration systems have steadily improved as the flexographic printing process has improved. The flexographic plate is selectively exposed to ultra violet light and unwanted areas washed away leaving a raised printing surface 103, shown in FIG. 2. Exposed photopolymer 102 with a lower floor level 104 that does not print, is separated by a displacement called the relief height 105, hence flexography is a relief printing process. The vast majority of the flexographic plates manufactured today are in sheet format, and are attached to a printing cylinder or sleeve 107, shown in FIG. 3, in register, using highly engineered double sided sticky back tape 106 with specific adhesion and compressibility properties for best print quality or productivity or both.

The plates 110, shown in FIG. 4, all have some form of register mark 111 and 112 on each side of the plate to allow easier plate to plate registration so that minimal time is spent in registration on press setup and optimum image quality is achieved. Over the years the types of register marks have progressed as mounting systems and methods have advanced. Originally the register marks 111 and 112 shown in FIG. 4, were large cross hairs for register on press. Placing the plates was a highly skilled process and often resulted in mis-register for at least one of the colors.

To enable greater productivity and accuracy, video mounting systems were developed, shown in FIG. 5. Two or more cameras 121, 123, were positioned on a frame 120, relative to a cylinder, for mounting the plate cylinder or sleeve 107, with focal points 122 and 124 on the surface of the cylinder or sleeve. The cameras were adjusted laterally 125 for the first plate and aligned with the plate cylinder or sleeve 107. Mounting tape is applied, and the plate is positioned above the plate cylinder or sleeve, shown in FIG. 6, with minor adjustments 126 to match the register marker 111 and 112, before fixing the cameras 121 and 123 in place. The plate is then affixed to the mounting tape 106 and the plate is imaged. Additional plates are mounted without adjustment of the camera position, as shown in FIG. 7, for accurate plate to plate location.

As demand for flexographic printing process grows, it is moving to process printing, that is, building images and colors out of four (CMYK), six, or seven process colors. It is important for process printing that the colors are in accurate registration to each other. With the printed dots being as small as 10-20 microns, any shift in registration can cause color shifts, image errors, or interference patterns with a negative impact on the final image. This has driven the industry to smaller register marks, shown in FIG. 8, with the large manual cross hairs 130, moving to smaller cross hairs 131 for video mounting, and then microdots 132.

As applications for functional printing develop for very small lines and circuits as small as five microns in width, and the need for accurate layer to layer registration, on printing register, and the mounting of the plates accurately on the print cylinders and sleeves increases, there is a further need for improvement in microdots. The current state of the art is to place 2 or more microdots on each of the plates, 115, 116, shown in FIG. 9, and use video mounting systems to locate and position the plate manually or automatically, shown in FIG. 10, and then fix the plates in place on engineered double sided mounting tape on the sleeve or cylinder.

Current microdots are typically 200-250 microns in size. A recent publication, U.S. Publication No. 2011/0265676, describes a registration system employing a scattered microdot pattern with each dot about 200 microns. Such large dots are objectionable when visible in the printed product. Smaller registration features are desired to ensure invisibility. In the printing of functional materials, such as electronic circuits, component sizes of five microns or less are desirable. When printing multiple layers, registration accuracy must be improved.

Traditionally the size of the microdots in flexo is limited to the size of a separate stand alone dot made of a group of pixels that can be consistently and independently formed on the plate. These are described as the minimum isolated dot size. In the majority of the flexoplate market this is presently between 120 and 250 microns.

Traditional digital flexo imaging technology uses Gaussian lasers, 140, shown in FIG. 11, versus the proposed technology using SQUAREspot imaging 141. The traditional Gaussian imaging produces an error in imaging 142, shown in FIG. 12, that limits the capabilities of imaging and image transfer, unlike the SQUAREspot imaging 143. This invention uses the exact reproduction of the original digital data 150, shown in FIG. 13A, on the thermal imaging layer 151, shown in FIG. 13B, and to the final plate 152, shown in FIG. 13C, as shown in the photograph in 153 in FIG. 14.

SUMMARY OF THE INVENTION

Briefly, according to one aspect of the present invention a method of making microdots for printing plate registration includes forming a first plurality of square spots less than or equal to 11 microns, 156. A first group of the first plurality of square spots 157 is formed in a first pattern and the first pattern is less than or equal to 66 microns and comprises a first microdot.

The invention provides a shaped dot with an equivalent circular diameter of about 33 to 66 microns on the printing plate surface 161, which is significantly smaller than traditional microdots 160. The shaped spot comprises a pattern of six or more square pixels each less than 11 microns edge length arranged in a contiguous manner 170, shown in FIG. 17. In conjunction with a machine vision system, the shaped spot provides registration information in two dimensions 171 for aligning the two or more printing plates for a multicolor or multilayer print. The structure of the patterns allows greater accuracy of register, providing specific points of reference and a smaller scale. This also allow directional confirmation to ensure the plate is correctly aligned 171, 172 and not rotated or inverted 173, 174. The combination of pixels allows greater resolution and accuracy going forward, especially with high resolution or automated mounting systems. Alternatively, structured microdots could be applicable, as shown in FIGS. 18, 19, and 20, Examples 1-20.

Pixel for pixel imaging allows the combination of unique patterns of pixels or additional image components to make an identifier for brand owners, 180, shown in FIG. 21 and 181, shown in FIG. 22 for security functionality, to identify the file preparer or printer at a micro level on the plate and on the print.

The invention and its objects and advantages will become more apparent in the detailed description of the preferred embodiment presented below.

DETAILED DESCRIPTION OF THE INVENTION

The present invention will be directed in particular to elements forming part of or in cooperation more directly with the apparatus in accordance with the present invention. It is to be understood that elements not specifically shown or described may take various forms well known to those skilled in the art.

Figure 1:
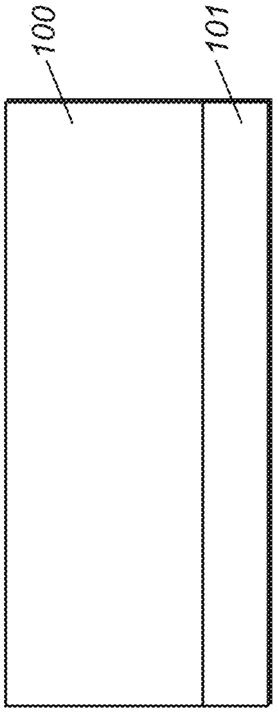
FIG. 1 (PRIOR ART)
FIG. 1 is a plan view of prior art registration marks on a printing plate.
Figure 2:
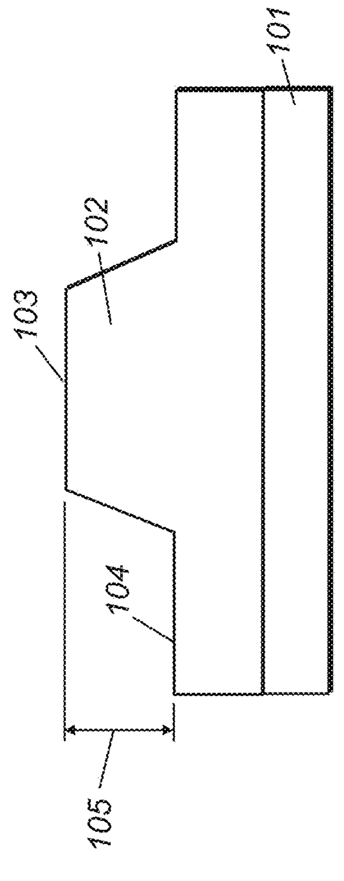
FIG. 2 (PRIOR ART)
FIG. 2 is a plan view of exposed and prepared photopolymer plate for printing.
Figure 3:
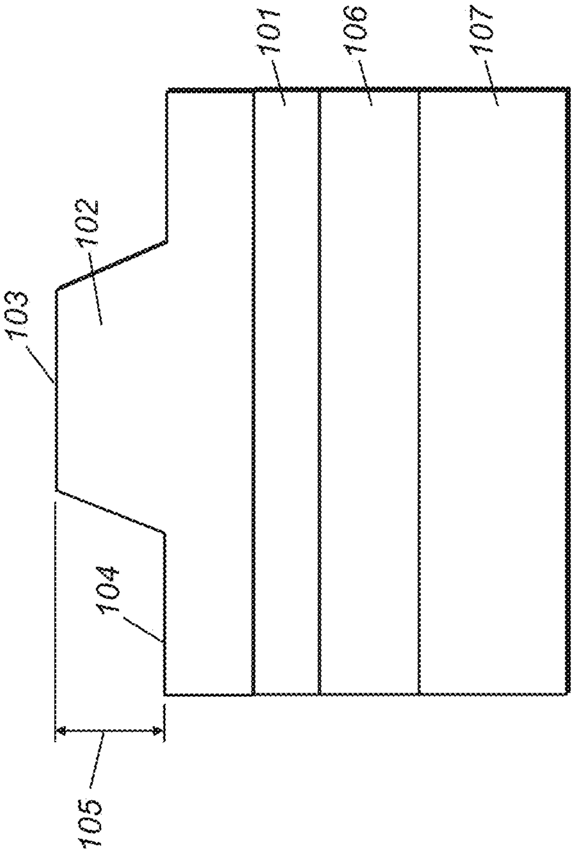
FIG. 3 (PRIOR ART)
FIG. 3 is a plan view of mounted photopolymer plate ready for printing.
Figure 4:
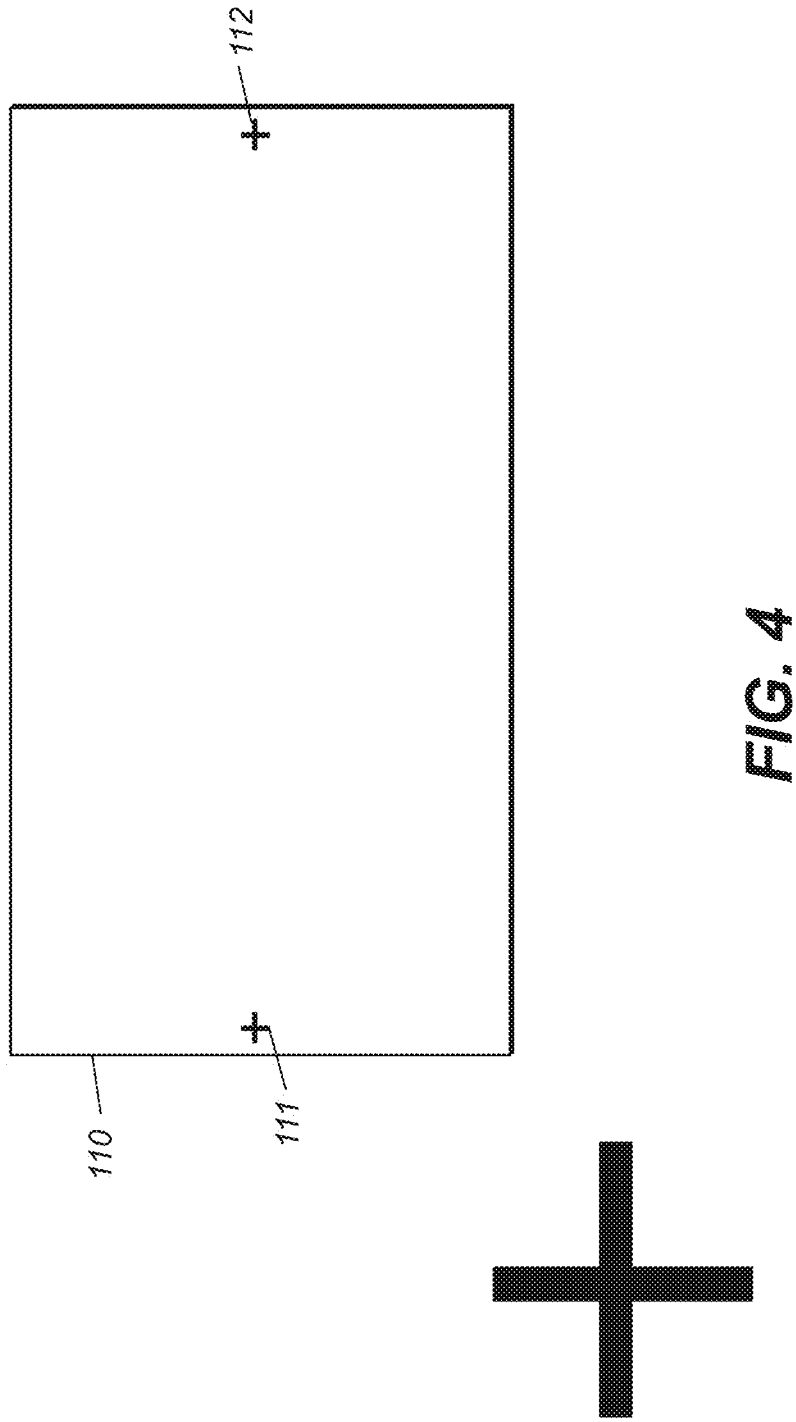
FIG. 4 (PRIOR ART)
FIG. 4 is a plan view of simple cross hair register marks on the two sides of the printing plate for manual register alignment on press.
Figure 5:
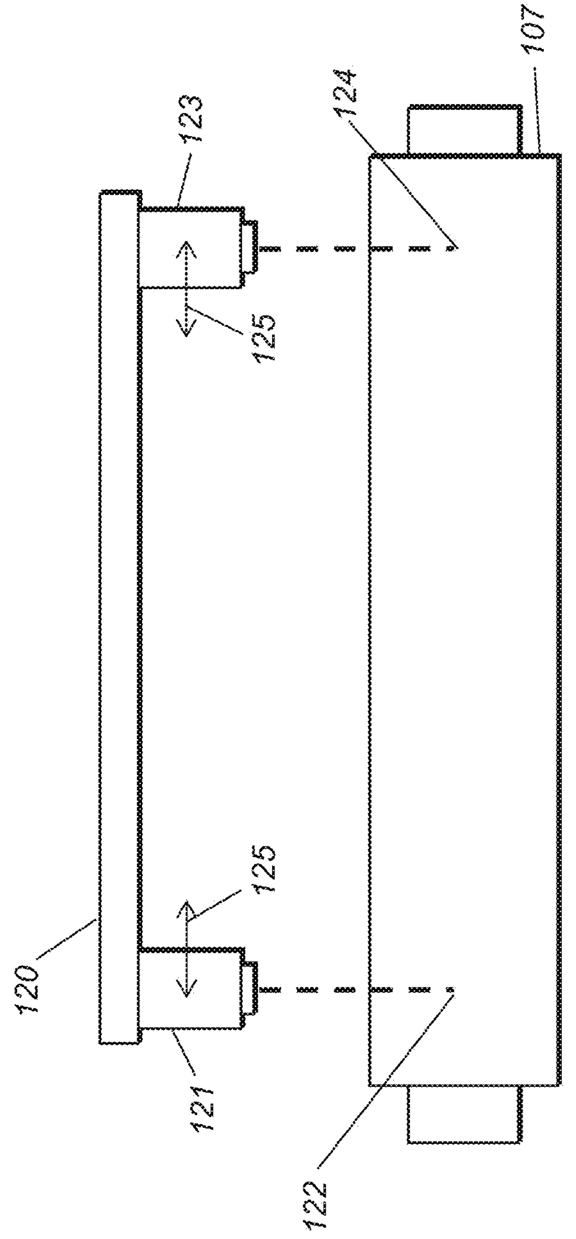
FIG. 5 (PRIOR ART)
FIG. 5 is a plan view of video mounting camera are aligned relative to first print cylinder or sleeve.
Figure 6:
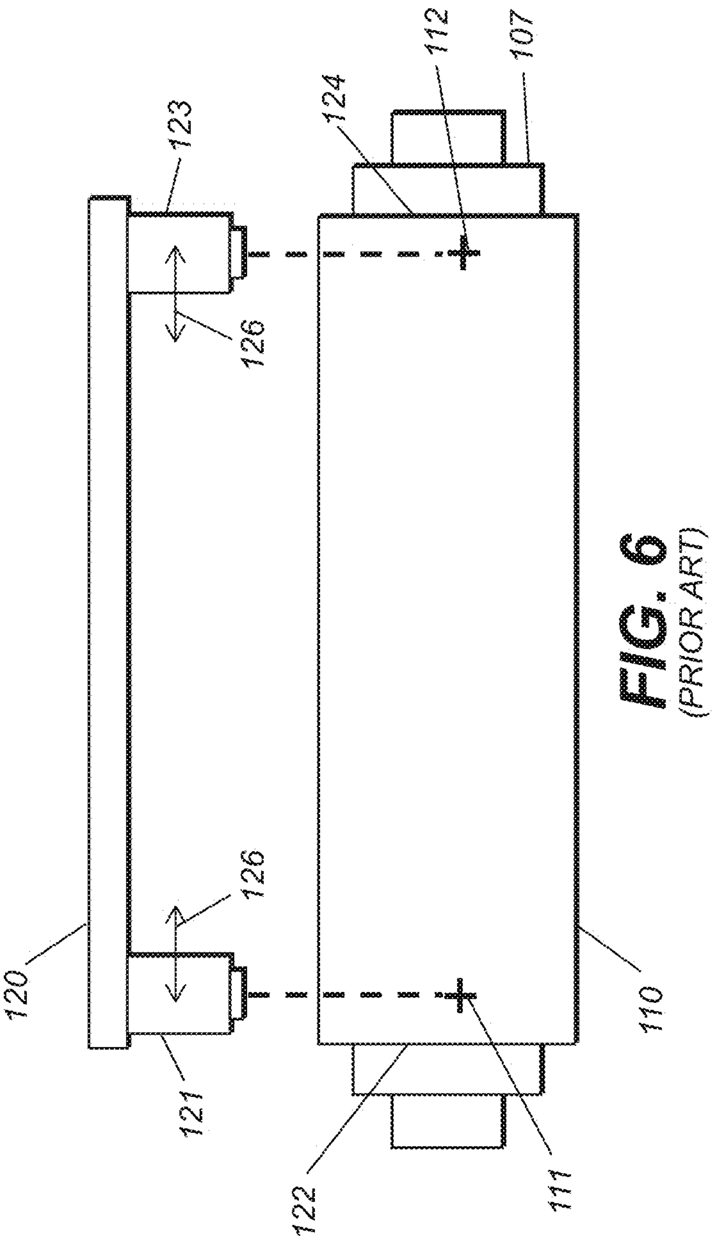
FIG. 6 (PRIOR ART)
FIG. 6 is a plan view of a plate aligned using video mounting camera for first plate to first print cylinder or sleeve.
Figure 7:
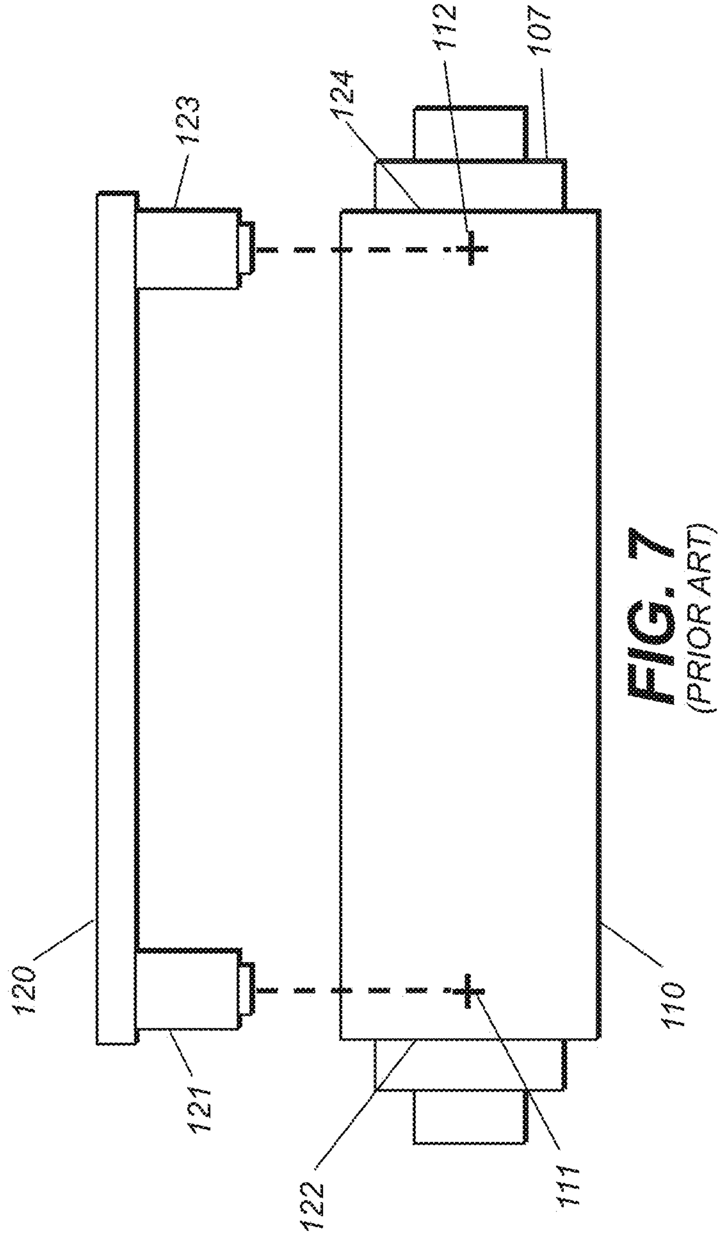
FIG. 7 (PRIOR ART)
FIG. 7 is a plan view of a plate aligned using fixed video mounting camera positions for additional plates relative to print cylinder or sleeve.
Figure 8:
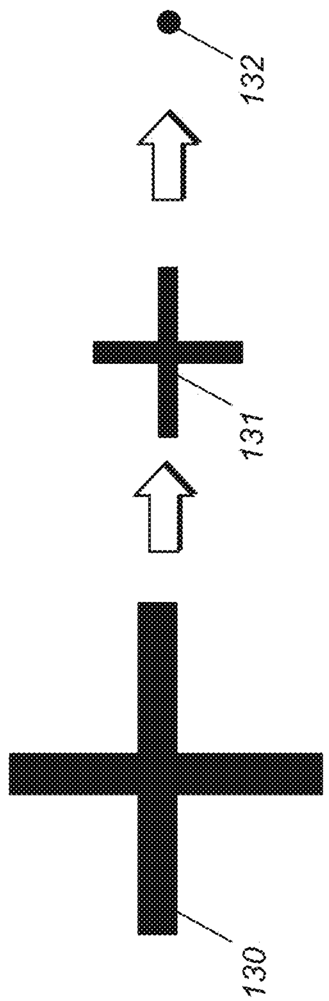
FIG. 8 (PRIOR ART)
FIG. 8 is a progression from large pairs of manual mounting marks, to smaller video camera marks and microdots.

FIG. 5 shows a video camera mounting for a device consisting of two cameras 121, 123 connected to the display. The cameras provide a point of reference in the direction of the cylinder 107 and allow adjustment on the first plate 110, shown in FIG. 6, so the register mark for each side of the plate 111, 112, often still small crosses, are in the camera center. The cameras are locked in position for each following plate to allow register.

Figure 10:
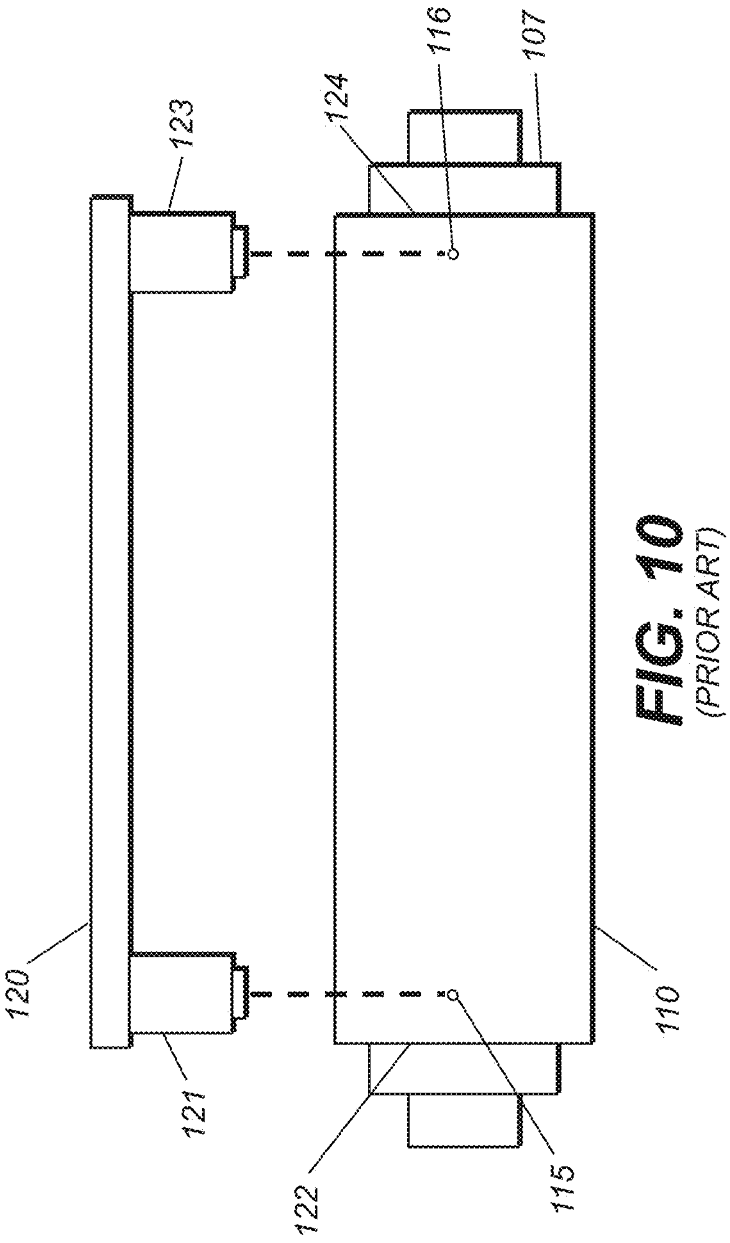
FIG. 10 (PRIOR ART)
FIG. 10 is a plan view of a plate aligned using fixed video mounting camera positions for additional plates relative to print cylinder or sleeve.

Referring to FIG. 10, some brand owners and packaging buyers objected to relatively large register marks in the artwork, especially as the capabilities and expectations for flexographic printing improved, so a less obvious register locator was needed. The new registration system suggested was a "microdot" 115, 116, which used isolated dots in the plate to provide the register mark, for use with video mounting systems. The microdot provided register control and a reduced impact on the final print.

A limitation of flexographic plate making with the existing plate manufacturers at the time was a minimum size for an isolated dot, which was 200-250 microns in size due to the manufacturing constraints. A smaller dot would not hold on the plate. (The standard industry specification today for the microdot size is 200-250 microns in diameter.)

The flexographic printing industry is now capable of matching or beating competitive printing processes in terms of print capabilities for resolution, density, and production speeds. It is now normal for flexographic printing to use process printing to build colors out of two or more screens instead of traditional spot colors, raising the flexographic printing capabilities even further. One issue in the transition from single spot colors to process printing, is that the demands on holding register are more critical than ever, with mis-register between two or more colors potentially causing a shift in the color and visible print defects.

Process printing today uses minimum dot sizes of 10-30 microns depending on application and print capabilities, so the use of a standard 200 micron registration mark is large and causes severe challenges on registration as print capabilities and expectations continue to rise.

Video mounting equipment has been improving significantly for manual and automatic registration control, yet registration remains controlled by a general 200 micron round dot, limited by the minimum isolated dot capabilities of traditional plate making.

Figure 11:
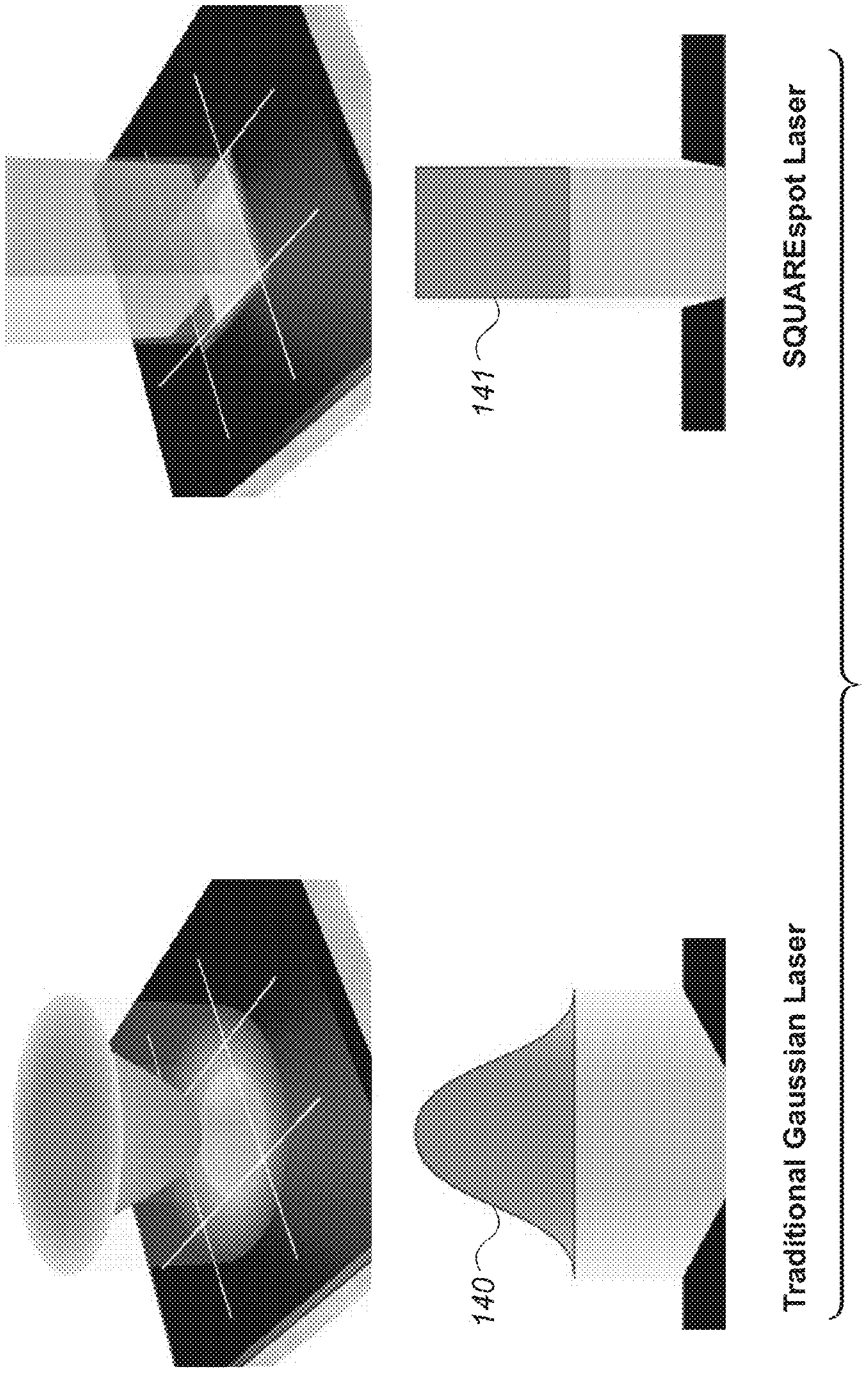
FIG. 11 (PRIOR ART)
FIG. 11 is a schematic of two existing laser imaging technologies.
Figure 12:
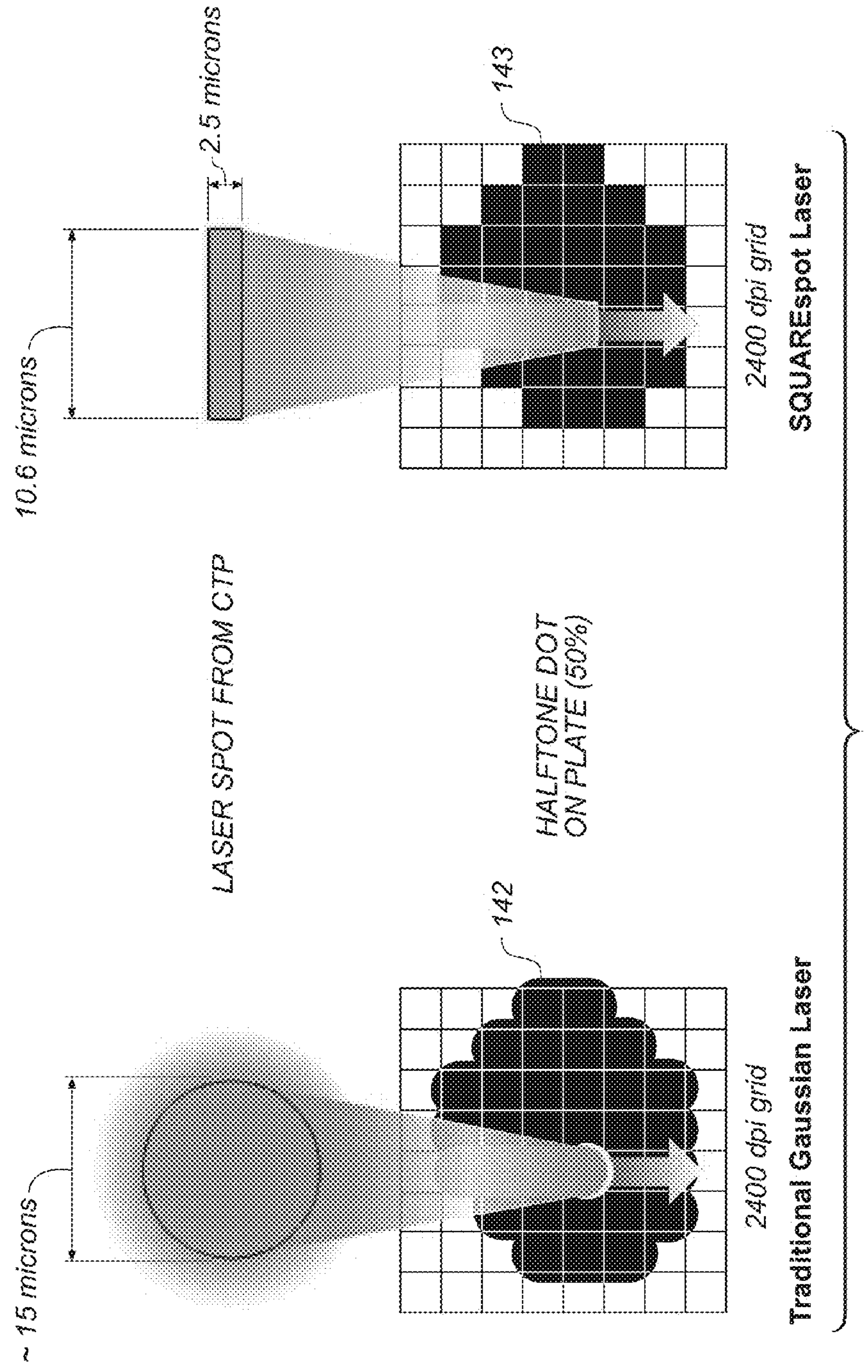
FIG. 12 (PRIOR ART)
FIG. 12 is a schematic of imaging characteristics of two existing laser imaging technologies.

All traditional lasers, see FIG. 11, 140, used for imaging of digital flexographic plate or film, use a round laser beam of Gaussian format, which has high power in the center and low power at the edges. The result is an inability to image the square pixels of a digital file accurately, with an imaging error in all cases. See FIG. 12.

Figure 13A:
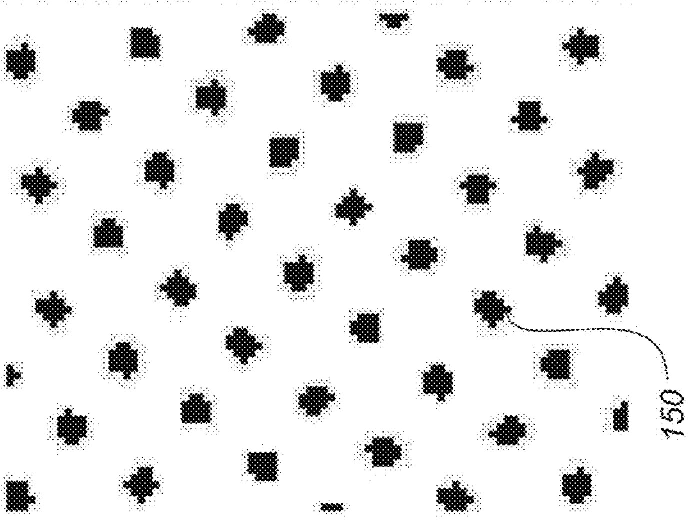
FIGS. 13A-13C are representations of pixel for pixel imaging with a square spot imaging system.
Figure 13B:
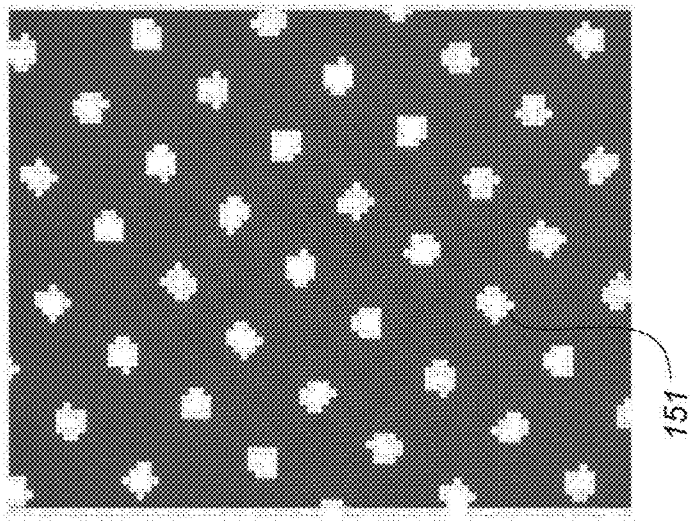
Figure 13C:
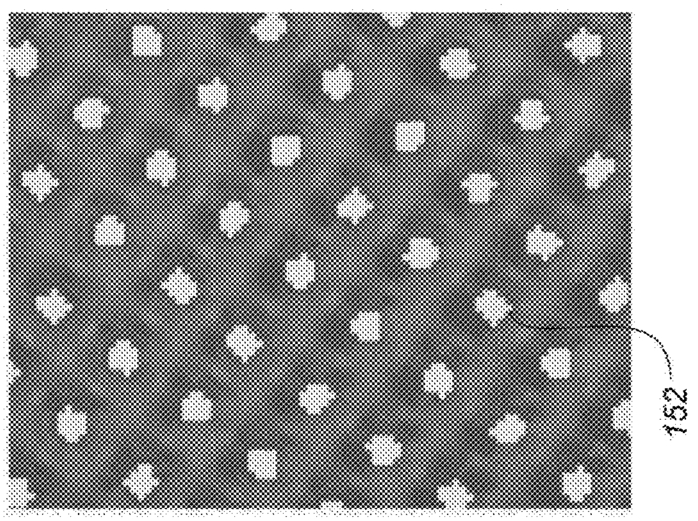
Figure 14:
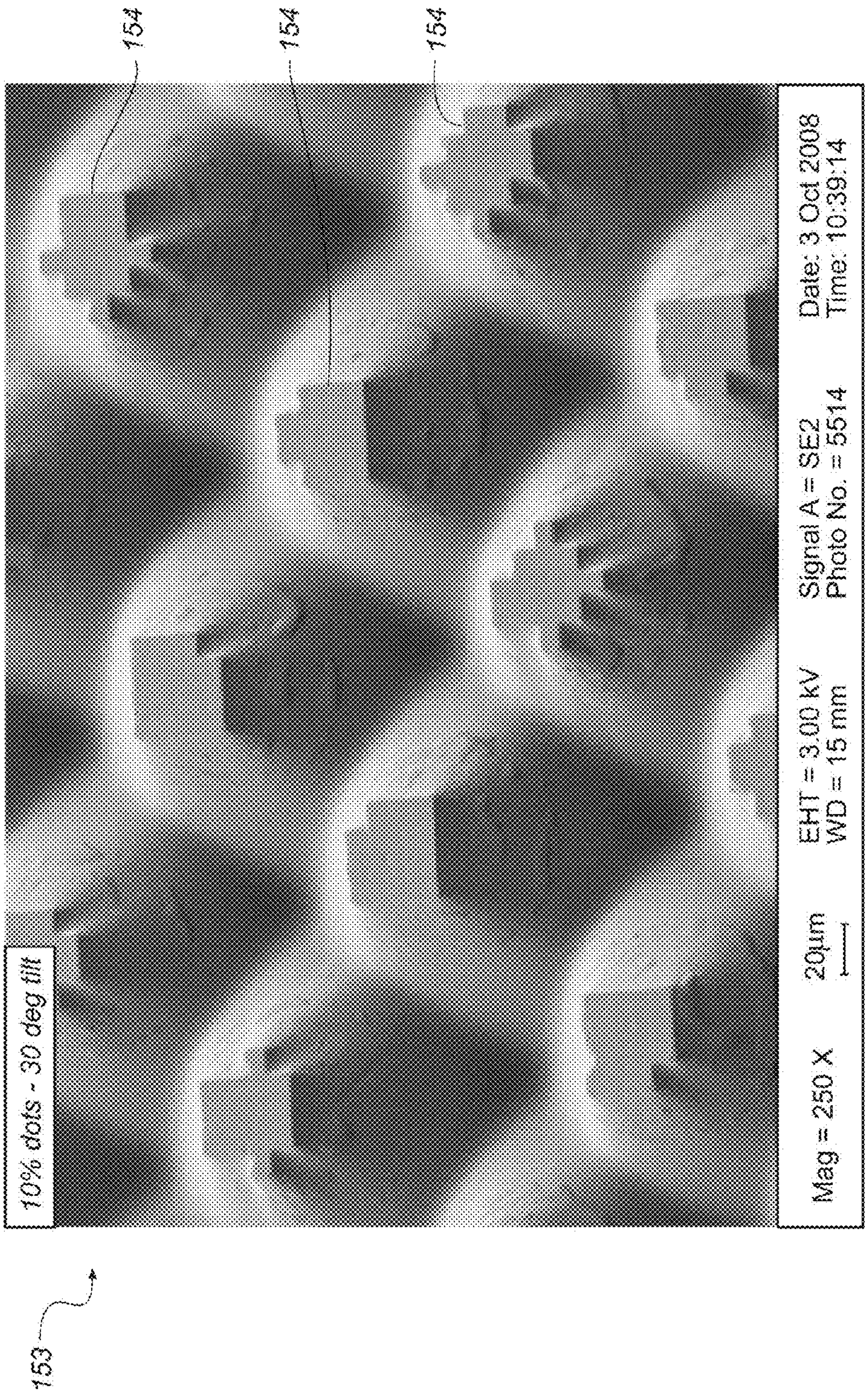
FIG. 14 is a photographic reproduction of a Kodak Flexcel NX plate, retaining pixel for pixel the original digital data in imaging.

Square spot imaging systems such as Kodak Flexcel NX, image flexographic plates, as shown in FIG. 11, to a thermal imaging layer (TIL), which is laminated to the flexographic plate. A pixel for pixel image transfer 150, 151, and 152 is created as shown in FIG. 13. This results in an imaged plate 153 which retains pixel to pixel integrity as shown in FIG. 14.

Figure 15:
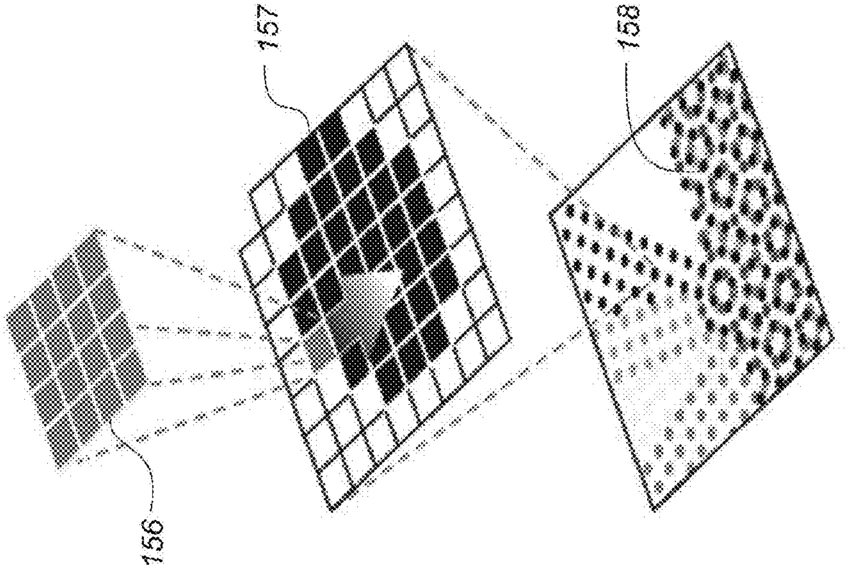
FIG. 15 is a schematic showing forming of a first plurality as a pixel and multiple pluralities as dot.

The structured microdot solution 154 allows a much higher level of process printing to be used because of the benefits of imaging accuracy. See FIG. 15. With the improvement in pixel for pixel imaging also came a smaller minimum isolated dot size of 50 microns, further increasing capabilities.

In March 2012 a panel of industry speakers at the FFTA Forum in San Antonio stated that "flexographic printing can match or better offset and rotogravure printing on all items, except register, and this remains the greatest limitation for process printing in flexography." The current microdots used in flexographic printing are limited to 200 microns in size by the minimum isolated dots capabilities of the plates, while the structured microdot solution can form 50 microns minimum isolated dots.

Current microdots are basically round dots of photopolymer without shape or structure to provide data other than basic location. The present invention uses the pixel for pixel imaging capabilities of the structured microdot system to produce a new structured microdot to supply greater accuracy in register, but also to provide additional data in terms of plate position, direction, and inversion.

Figure 9:
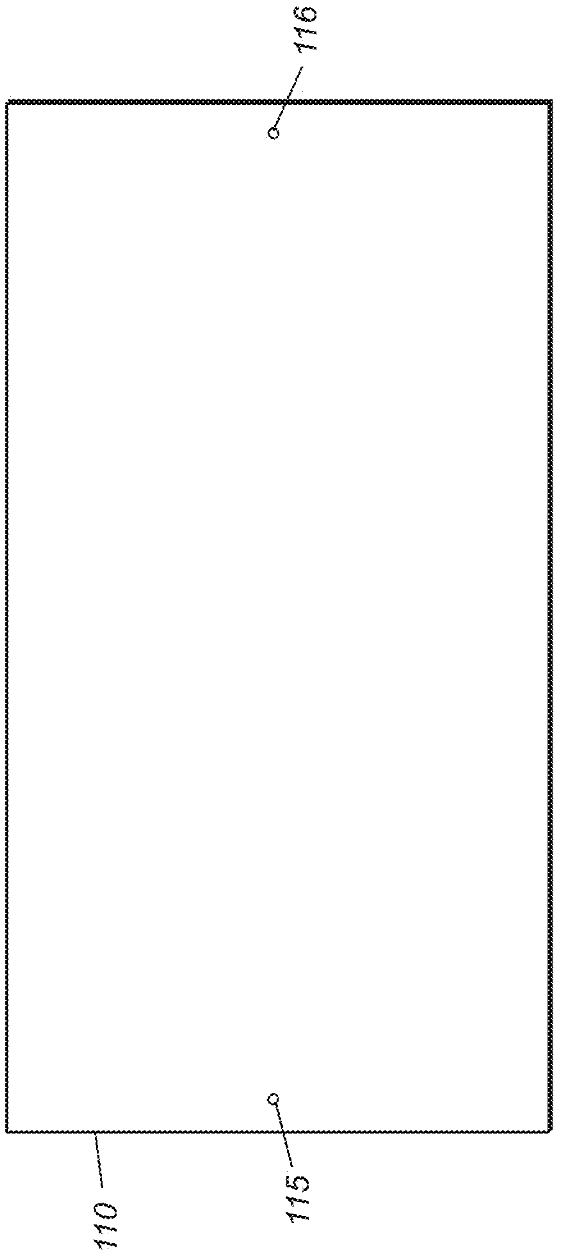
FIG. 9 (PRIOR ART)
FIG. 9 is a plan view of a plate showing pair of microdot register marks on the plate.

The present invention uses structured microdots that are 66 microns or less in dimension, and are a combination or a series of imaged pixels to produce a structured shape allowing straight edges for register along with image components that will indicate direction, rotation, or inversion issues, for use with manual or automatic video mounting systems. The present invention allows use of a single pair of microdots on either side of the plate, as shown in FIG. 9. Patterns of microdots in the image area allows for on-press monitoring of register and automatic adjustments, such as U.S. Publication No. 2011/0265676.

Figure 16:
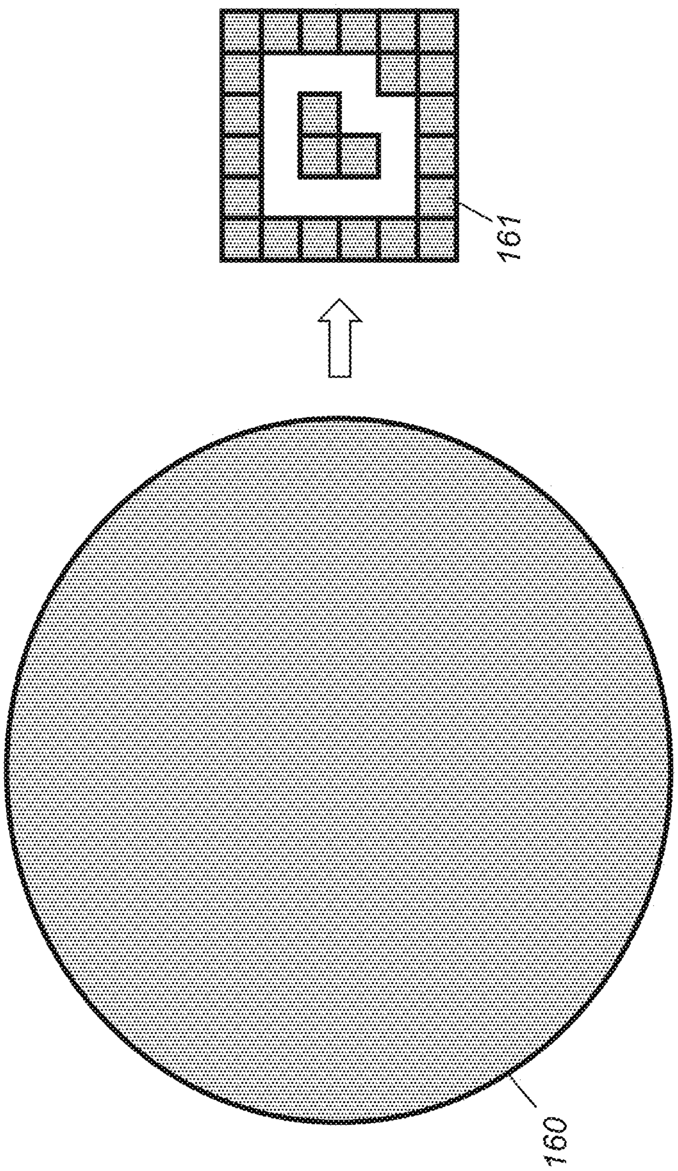
FIG. 16 illustrates the scale reduction for traditional microdot to proposed structured microdot size.

The present invention provides a smaller microdot compared to the prior art, with clear structure. See FIGS. 16 and 17. This provides clear benefits in the capabilities to achieve better accuracy in register.

Figure 17:
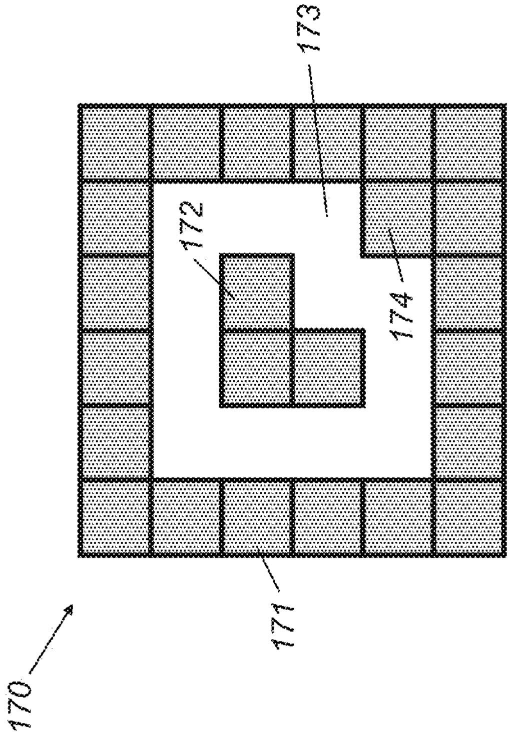
FIG. 17 shows a primary structured microdot.
Figure 18:
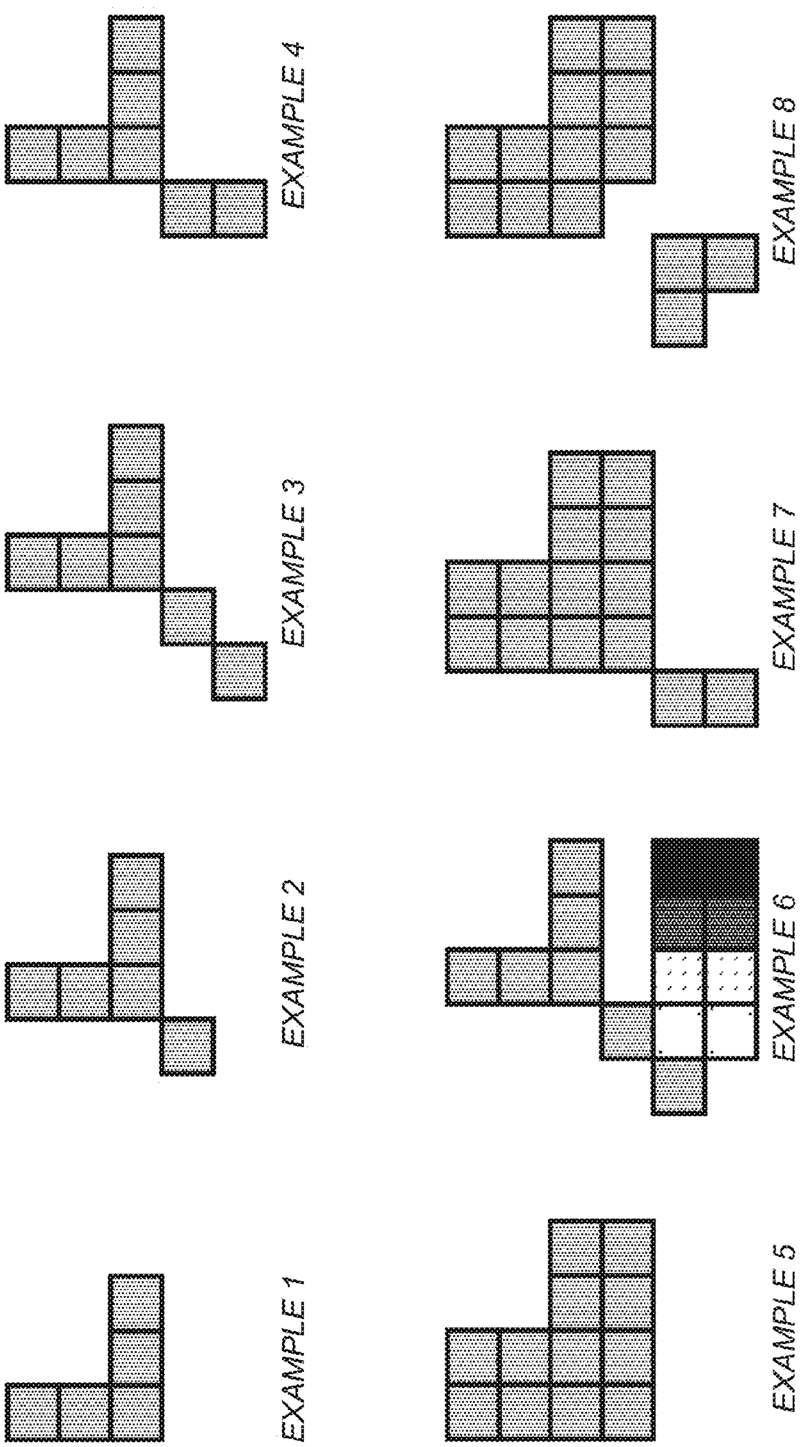
FIG. 18 shows an alternative version of the structured microdots built from individual square pixels.
Figure 19:
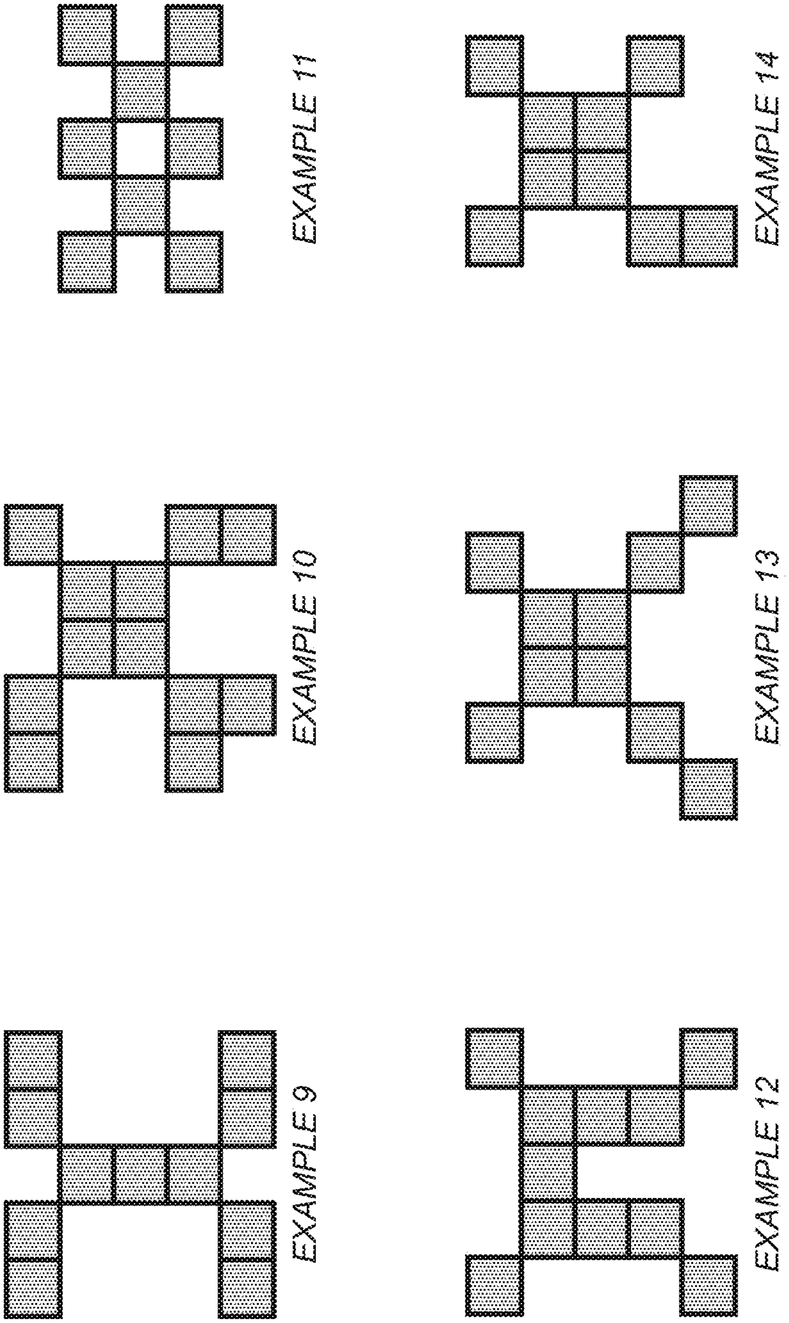
FIG. 19 shows an alternative versions of the structured microdots built from individual square pixels.
Figure 20:
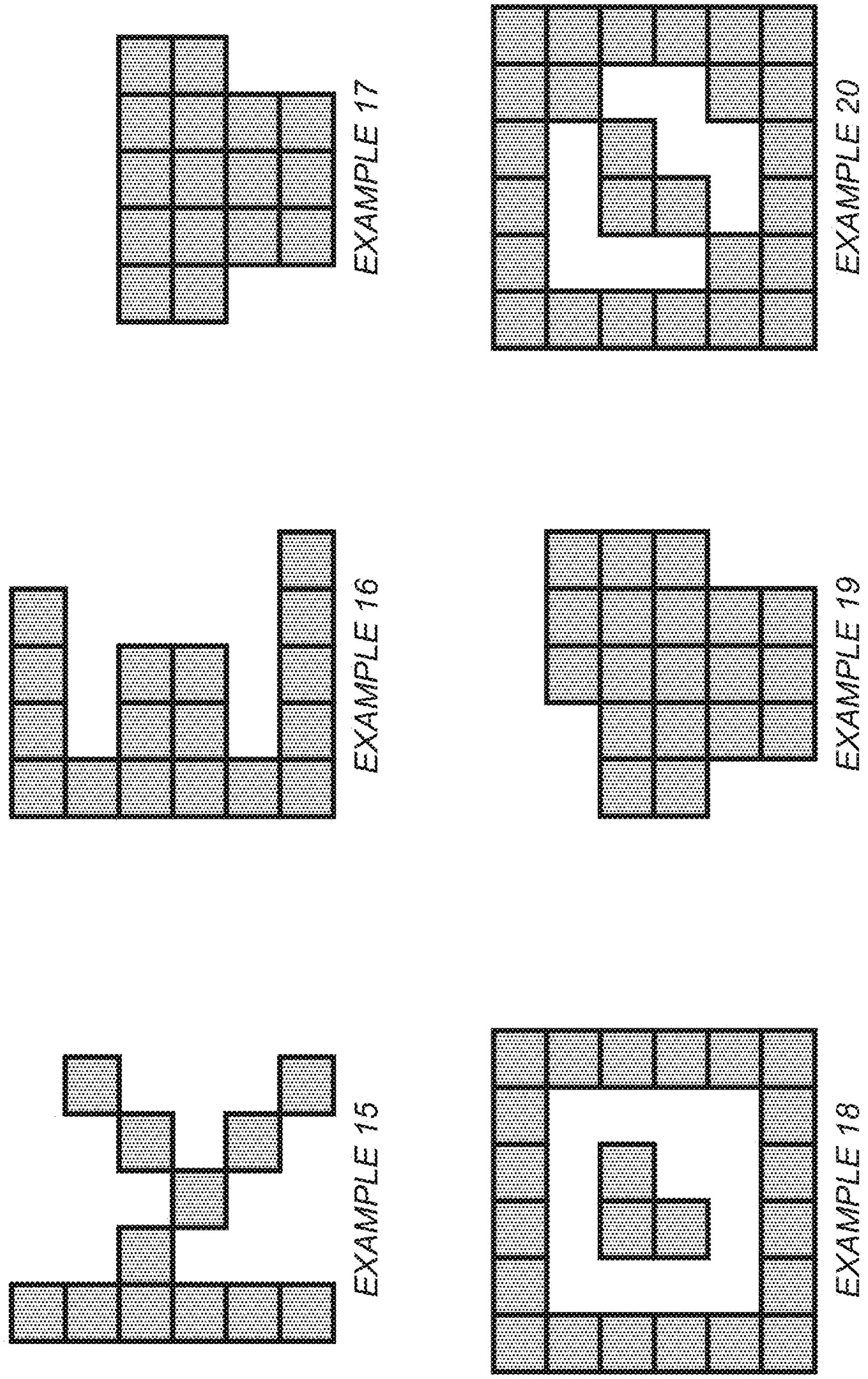
FIG. 20 shows an alternative versions of the structured microdots built from individual square pixels.

There are several options for the structured microdot as shown in FIGS. 18, 19, and 20. One embodiment of a structured register microdot is shown in FIG. 17 with 6×6 pixel outer structure to provide large scale register with straight edges for maximum reference.

The inner section 172 provides the ability to register to an even finer level with suitable equipment, or for more challenging demands. The inner section also provides a clear indication if the plate is rotated or inverted, and can act as a check point to ensure the plate is mounted in the correct orientation. These features combine to enhance the register capabilities of the flexographic plate system in mounting before coming to the printing press, allowing reduced adjustments on press, greater image accuracy, and production efficiencies.

The benefits of using structured microdots for the flexographic printing industry have enhanced benefits for specific markets. For example, moving from a broad round microdot with no straight edges or corners, to a structure in the present invention, with right angle corners, provides benefits in registration measurement and control. Reducing the size of the microdot from 200 microns to the structure microdot of 66 microns or less also provides a significant opportunity to reduce registration errors and increase accuracy.

Changing from traditional Gaussian imaging with or without oxygen inhibition in plate making, with its inherent errors in size and variability, to pixel for pixel imaging accuracy, enhances register capabilities and reduces significantly the plate making tolerances on the microdot and register accuracy. A square outer structure with straight edges and a right angle corner also allows greater accuracy in two perpendicular directions.

Having an inner component allows higher accuracy on registration if the application requires it. Having an inner structure that is not consistent in all directions allows any rotation of the plate to be identified and rejected or corrected, relevant to manual and automatic mounting systems. An inner structure on the structured microdot, allows identification if the plate is inverted with the non-imaged side up instead of down, which is particularly useful when using automatic mounting systems.

Functional printing applications tend to rely on the printing of lines and circuits more than dots and process on the final substrate. There exists a need to obtain the highest level of accuracy in mounting relates to the need to print circuits and lines of down to five microns in position to the next conductive or resistive material, and achieve the required electronic conductive or resistive properties and circuit function.

When printing, a 200 micron microdot is too large to truly provide the tolerances required. The reduction in size and increase in accuracy for the structured microdot suits the demands of industry and the inner structure allows the highest level of accuracy, especially with automated mounting systems. The clear and immediate identification of any rotation and inversion of the plate is important where the layers of the circuits and their direction may not be obvious, and costs in the components mean errors are extremely expensive.

Although all of the applications of the structured microdot have focused on registration benefits, in the discussion above there are also opportunities to utilize the structured microdot in new ways when it is printed. One opportunity is in covert security to identify the pre-press provider, printer, or both, which is especially useful for brands that use several prepress and printers for the same product range.

The use of the microdot for a covert security feature may be feasible depending on the print and resolution capabilities of the flexo printing process. In its simplest form it could be a series of 66 micron full blocks, half blocks, and triangles in a set combination in one or more of the eight possible locations around the structured microdot. See FIGS. 21 and 22.

Figure 21:
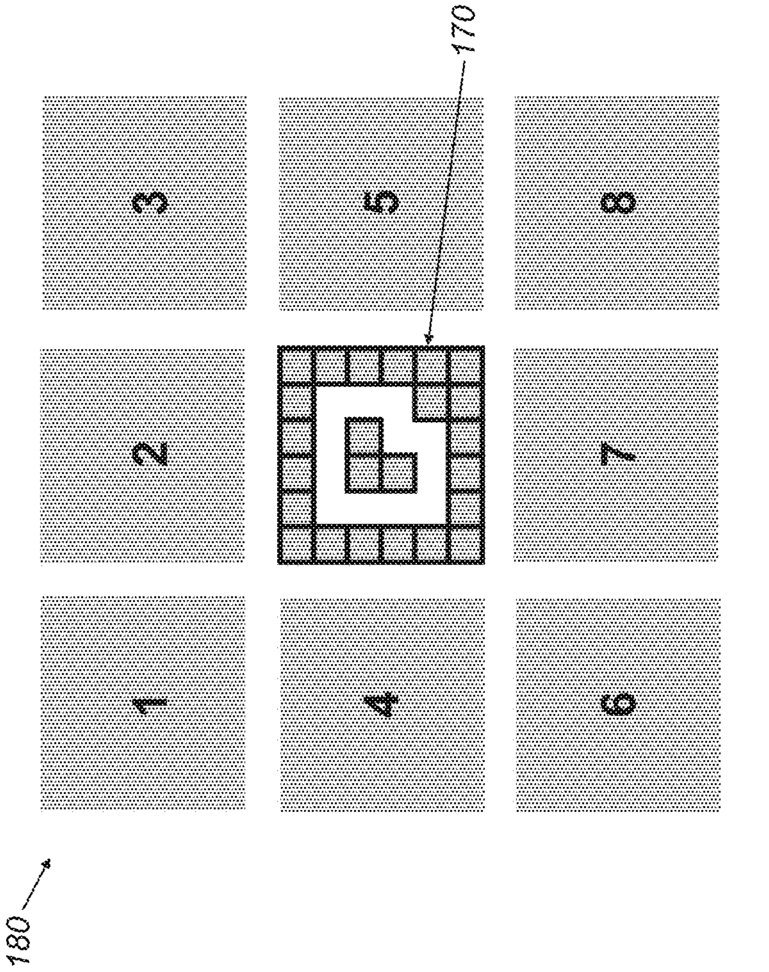
FIG. 21 shows additional structured microdots around for security or identification marker features.
Figure 22:
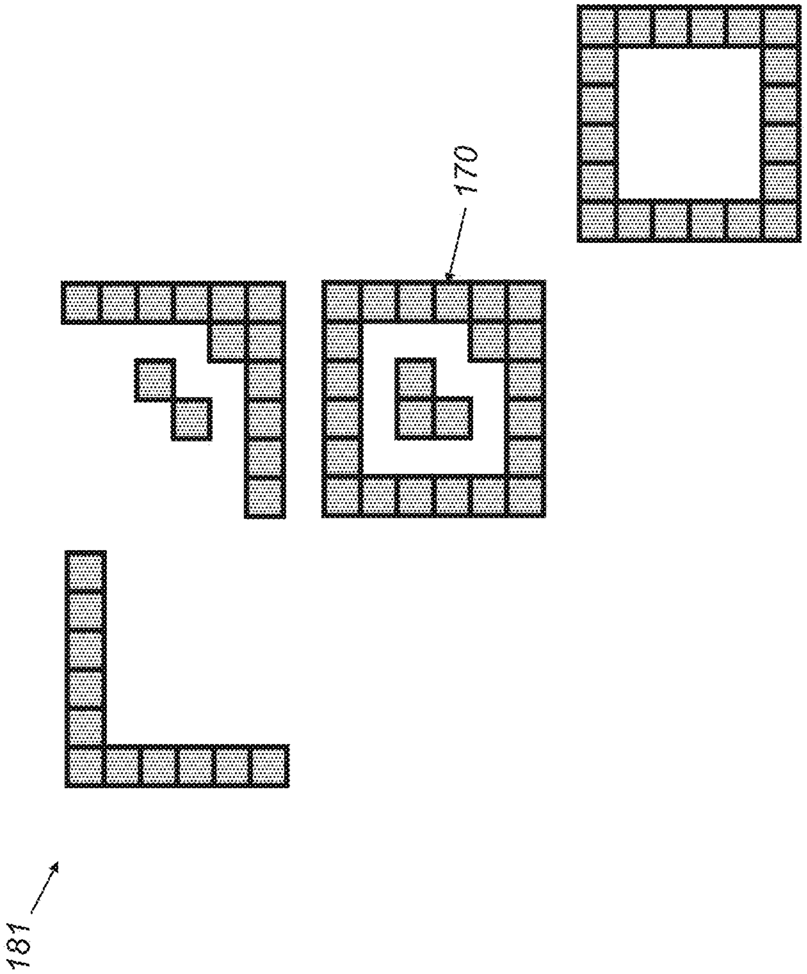
FIG. 22 shows a combination of positions for identification or security marker features.

The ability of the microdot to be used in a covert security manner, with patterns only known or understood by the brand owners and their prepress providers gives a strong tool for identification of illegal or incorrect actions. The structured microdot, when using all security areas as solid blocks, similarly to the areas shown in FIG. 21, is no larger in side to side dimension than that the existing standard microdot at 200 microns. With the higher resolution capabilities of some applications and printers, there is no reason why these security markers cannot be more communicative and detailed. See FIG. 22. Overall it provides the brand owners, pre-press provider, or printer with a new microscopic identifier opportunity. These security features can be created out of a single color, or combination of the process printing colors (CMYK) for further unique combinations.

Figure 23:
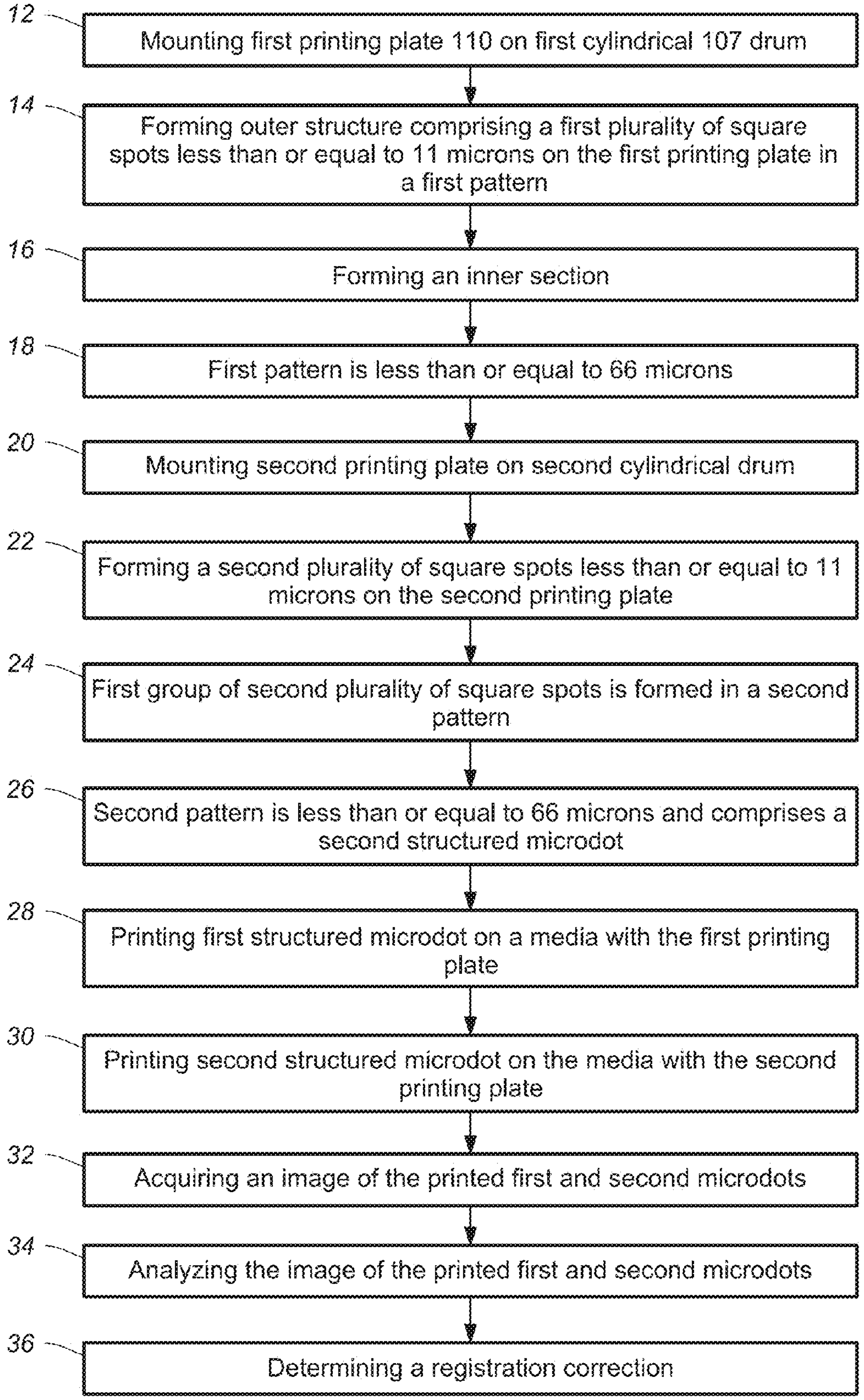
FIG. 23 is a block diagram of a method of mounting a printing plate.

FIG. 23 is a block diagram of a method for registering printing plates. A first printing plate is mounted on a first cylindrical drum 12 and an outer structure is formed including a first plurality of square spots less than or equal to 11 microns in a first pattern 14. An inner section is formed 16 including a second plurality of square spots less than or equal to 11 microns and internal to the outer structure and the first pattern is less than or equal to 66 microns 18 and includes a first structured microdot. A second printing pate is mounted on a second cylindrical drum 20 and a second plurality of square spots less than or equal to 11 microns is formed on the second printing plate 22 and a first group of the second plurality of square spots is formed in a second pattern 24 and the second pattern is less than or equal to 66 microns and includes a second structured microdot 26. The first structured microdot is printed on a media with the first printing plate 28 and the second structured microdot is printed on the media with the second printing plate 30. An image of the printed first and second microdots is acquired 32 and the image of the printed first and second microdots is analyzed 34 and a registration correction is determined 36.

The invention has been described in detail with particular reference to certain preferred embodiments thereof, but it will be understood that variations and modifications can be effected within the scope of the invention.

PARTS LIST

12 mounting cylindrical drum
14 forming outer structure including first plurality of square spots
16 forming inner section
18 first pattern less than or equal to 66 microns
20 mounting second printing plate on second cylindrical drum
22 forming second plurality of square spots on second printing plate
24 first group of second plurality of square spots formed in a second pattern
26 second pattern is less than or equal to 66 microns
28 printing first structured microdot on media with first printing plate
30 printing second structured microdot on media with second printing plate
32 acquiring image of printed first and second microdots
34 analyzing image of printed first and second microdots
36 determining a registration correction
100 unexposed photopolymer
101 supporting polymer
102 exposed photopolymer
103 plate print surface
104 plate floor surface
105 plate relief height
106 double sided mounting tape
107 plate cylinder or sleeve
110 imaged printing plate ready for mounting
111 operator side cross hair register mark
112 machine side cross hair register mark
115 operator side microdot register mark
116 machine side microdot register mark
120 mounting camera frame
121 operator side mounting camera
122 operator side camera focus point
123 machine side mounting camera
124 machine side camera focus point
125 lateral adjustments for cameras for initial location control
126 fine lateral adjustments for cameras for final location control
130 original large register cross hairs for manual plate mounting
131 smaller register cross hairs for video plate mounting
132 microdots for smallest video plate mounting marks
140 Gaussian laser with round later beam technology
141 SQUAREspot laser with sharp square profile technology
142 Gaussian laser imaging with round laser beam technology
143 SQUAREspot laser imaging with sharp square profile technology
150 digital file ready for imaging showing individual pixels forming a structured microdot
151 imaged thermal imaging laser showing retained digital data as pixels forming a structured microdot
152 final Flexcel NX flexographic plate showing retained digital data to final plate forming a structured microdot
153 plate of structured microdots
154 structured microdots
156 single plurality to form pixel
157 multiple pluralities to form structured dot
158 dots build to form required image structured microdot
160 scaled illustration of traditional microdot for comparison
161 scaled illustration of proposed structured microdot demonstrating size reduction to enhance registration control
170 overall proposed structured microdot constructed out on individual pixels
171 outer square line provide scale at less than 66 microns, straight edges, right angle corners to give maximum point of reference and register capabilities
172 inner block provides secondary reference point for finer register control
173 asymmetrical structure for inversion and rotation identification
174 further asymmetrical structure for inversion and rotation identification
180 eight additional structured microdot locations for potential security of identification functions
181 additional various alternative structured microdots in locations 1, 2, and 8 for potential individual security or identification functions

The invention claimed is:

1. A method of forming structured microdots on a printing plate comprising:

forming an outer structure comprising a first plurality of square spots less than or equal to 11 microns in a first pattern;

forming an inner section comprising a second plurality of square spots less than or equal to 11 microns and internal to the outer structure wherein a gap separates the internal and outer structure; and wherein the first pattern is less than or equal to 66 microns and comprises a first microdot.

2. The method of claim 1 comprising:

forming a second plurality of square spots less than or equal to 11 microns;

wherein a second group of the second plurality of square spots is formed in a second pattern; and wherein the second pattern is less than or equal to 66 microns and comprises a second microdot.

3. The method of claim 1 wherein the first microdot is formed on a flexographic printing plate.

4. The method of claim 2 wherein the first and second microdots are formed on different sides of a flexographic printing plate.

5. The method of claim 1 wherein a second plurality of square spots is formed adjacent the first plurality of square spots.

6. The method of claim 5 wherein the first and second pluralities are different colors.

7. The method of claim 5 wherein the first and second pluralities are in contact.

8. The method of claim 2 wherein the first structured microdot is asymmetrical.

9. The method of claim 8 wherein the first structured microdot is asymmetrical in a horizontal and a vertical direction.

10. The method of claim 1 wherein the first pattern is a machine readable security code.

11. A method for registering printing plates comprising:

mounting a first printing plate on a first cylindrical drum;

forming an outer structure comprising a first plurality of square spots less than or equal to 11 microns on the first printing plate in a first pattern;

forming an inner section comprising a second plurality of square spots less than or equal to 11 microns and internal to he outer structure wherein a gap separates the internal and outer structure;

wherein the first pattern is less than or equal to 66 microns and comprises a first structured microdot;

mounting a second printing plate on a second cylindrical drum;

forming a second plurality of square spots less than or equal to 11 microns on the second printing plate;

wherein a first group of the second plurality of square spots is formed in a second pattern;

wherein the second pattern is less than or equal to 66 microns and comprises a second structured microdot;

printing the first structured microdot on a media with the first printing plate;

printing the second structured microdot on the media with the second printing plate;

acquiring an image of the printed first and second microdots;

analyzing the image of the printed first and second microdots; and determining a registration correction.

12. The method of claim 1 wherein the inner section is asymmetrical in a horizontal and a vertical direction.

* * * * *